United States Patent
Ma et al.

(10) Patent No.: US 7,961,697 B2
(45) Date of Patent: *Jun. 14, 2011

(54) METHOD AND APPARATUS FOR ESTIMATING TIMING ERROR AND FREQUENCY OFFSET OF HPI SYSTEM

(75) Inventors: Zhang-Yong Ma, Daejeon (KR); Young-Il Kim, Daejeon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 673 days.

This patent is subject to a terminal disclaimer.

(21) Appl. No.: 11/722,063

(22) PCT Filed: Mar. 25, 2005

(86) PCT No.: PCT/KR2005/000887
§ 371 (c)(1),
(2), (4) Date: Jun. 18, 2007

(87) PCT Pub. No.: WO2006/068347
PCT Pub. Date: Jun. 29, 2006

(65) Prior Publication Data
US 2008/0008082 A1    Jan. 10, 2008

(30) Foreign Application Priority Data
Dec. 21, 2004 (KR) .................. 10-2004-0109427

(51) Int. Cl.
*H04B 7/208* (2006.01)
(52) U.S. Cl. ......... 370/344; 370/208; 370/319; 370/430
(58) Field of Classification Search .................. 370/203, 370/206, 210, 430, 208, 319, 344; 375/326
See application file for complete search history.

(56) References Cited

U.S. PATENT DOCUMENTS

| | | | | |
|---|---|---|---|---|
| 4,715,029 A * | 12/1987 | Crookshanks | | 370/210 |
| 5,689,502 A * | 11/1997 | Scott | | 370/281 |
| 6,633,614 B1 * | 10/2003 | Barton et al. | | 375/264 |
| 6,633,616 B2 * | 10/2003 | Crawford | | 375/326 |
| 6,650,616 B2 * | 11/2003 | Crawford | | 370/203 |
| 6,658,063 B1 * | 12/2003 | Mizoguchi et al. | | 375/260 |
| 7,042,858 B1 * | 5/2006 | Ma et al. | | 370/331 |
| 7,286,514 B2 * | 10/2007 | Bar-Ness et al. | | 370/338 |
| 2003/0026197 A1 * | 2/2003 | Crawford | | 370/203 |
| 2003/0053413 A1 * | 3/2003 | Sawahashi et al. | | 370/208 |
| 2004/0076225 A1 * | 4/2004 | You et al. | | 375/148 |
| 2004/0240376 A1 * | 12/2004 | Wang et al. | | 370/204 |

FOREIGN PATENT DOCUMENTS
WO    WO 03/081938 A1 * 10/2003

* cited by examiner

*Primary Examiner* — Dang T Ton
*Assistant Examiner* — Robert M Morlan
(74) *Attorney, Agent, or Firm* — Jefferson IP Law, LLP

(57) ABSTRACT

The present invention relates to a method for estimating a timing error and a frequency offset in a high-speed portable Internet system and a method thereof. A predetermined preamble symbol is added to an OFDM frame to be transmitted by a transmitter according to an exemplary embodiment of the present invention, an IFFT operation is performed, and then a pseudo noise is multiplexed by the preamble symbol to estimate the timing error and the frequency offset. A receiver receives an OFDM symbol, extracts the preamble symbol from the OFDM symbol, and multiplexes the extracted preamble symbol by a local pseudo noise, which is equal to the pseudo noise used by the transmitter but is shifted.

11 Claims, 8 Drawing Sheets

[FIG. 1]
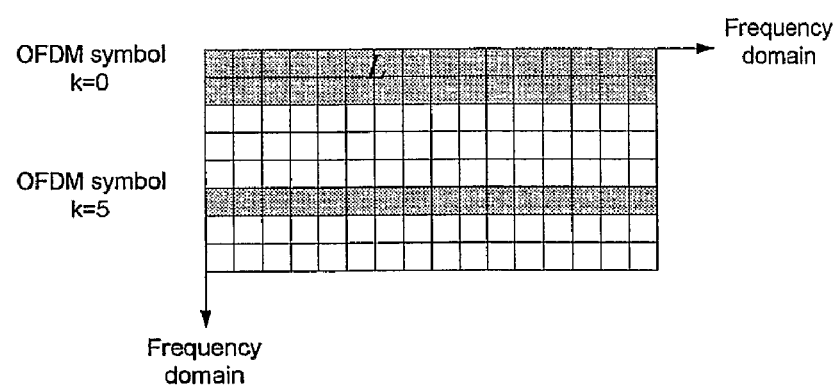

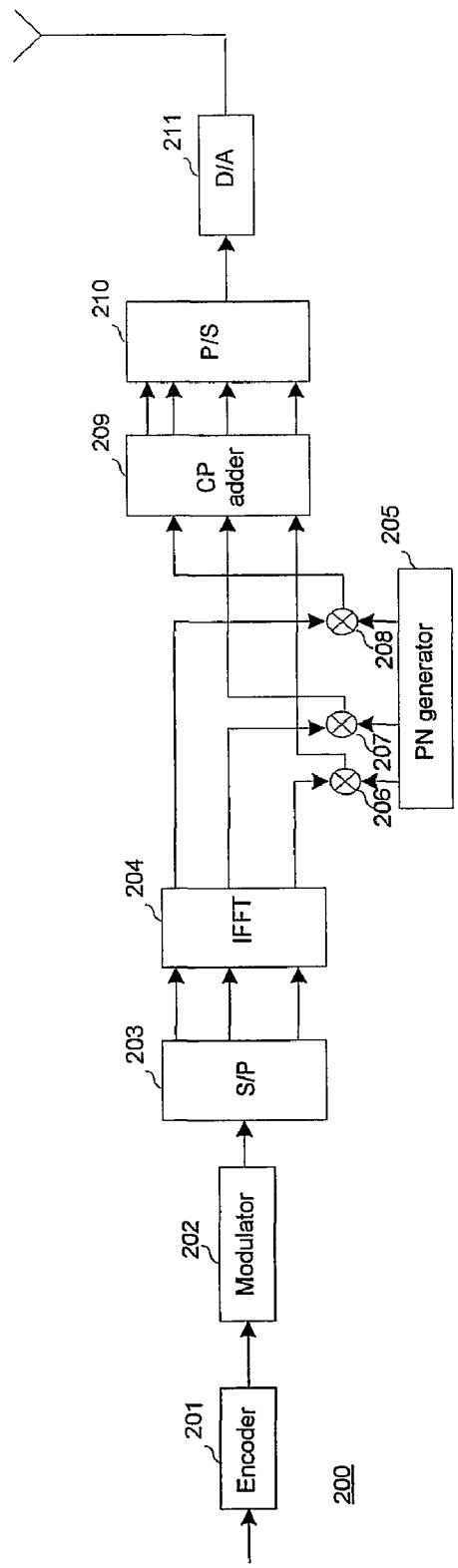
[FIG. 2]

[FIG. 3]
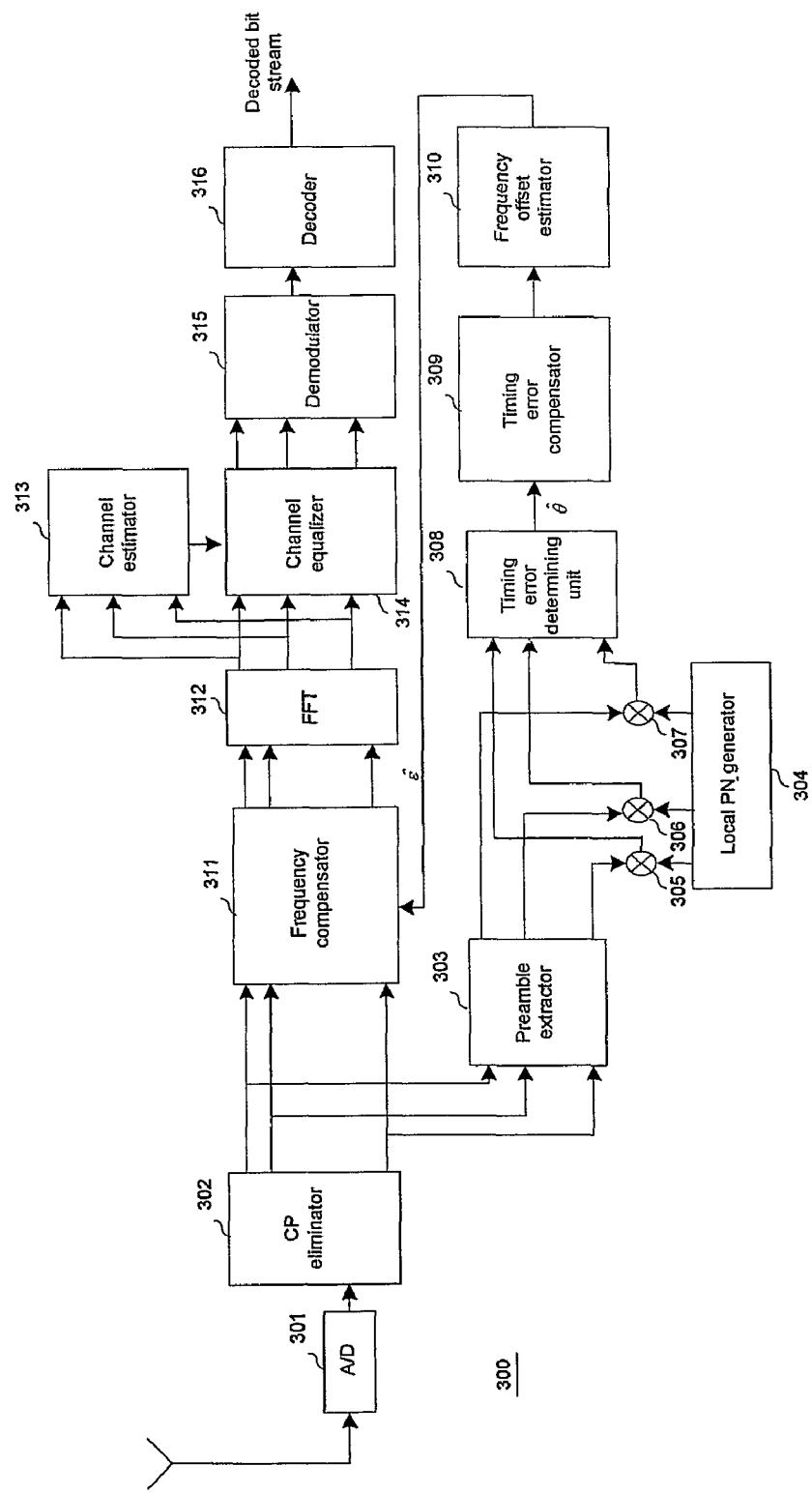

[FIG. 4]
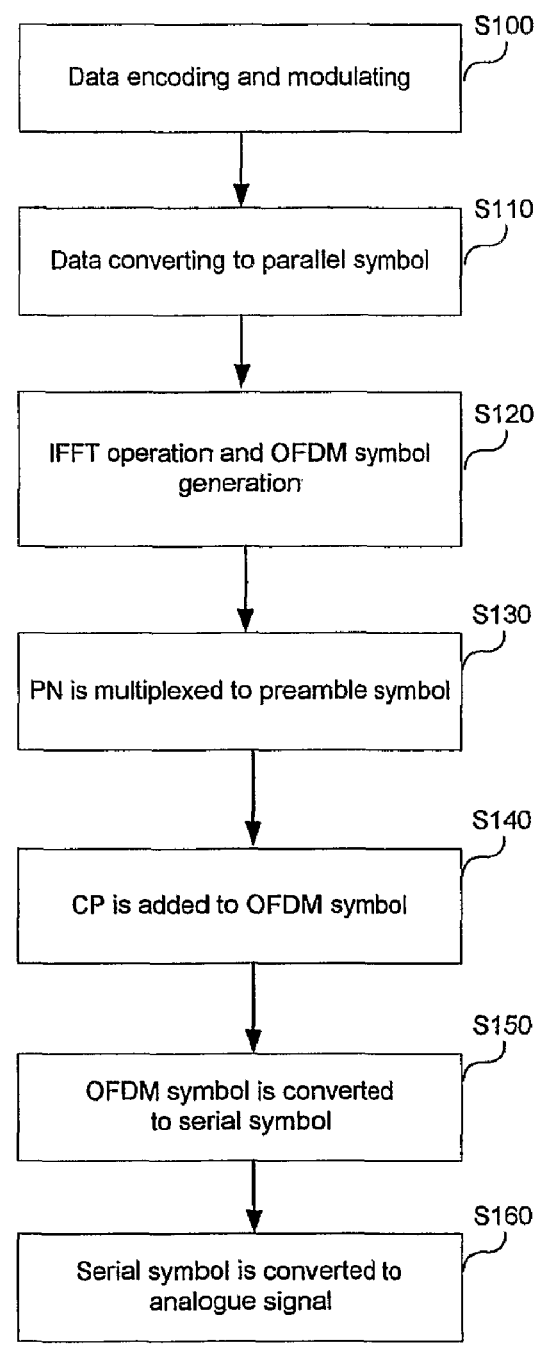

[FIG. 5]
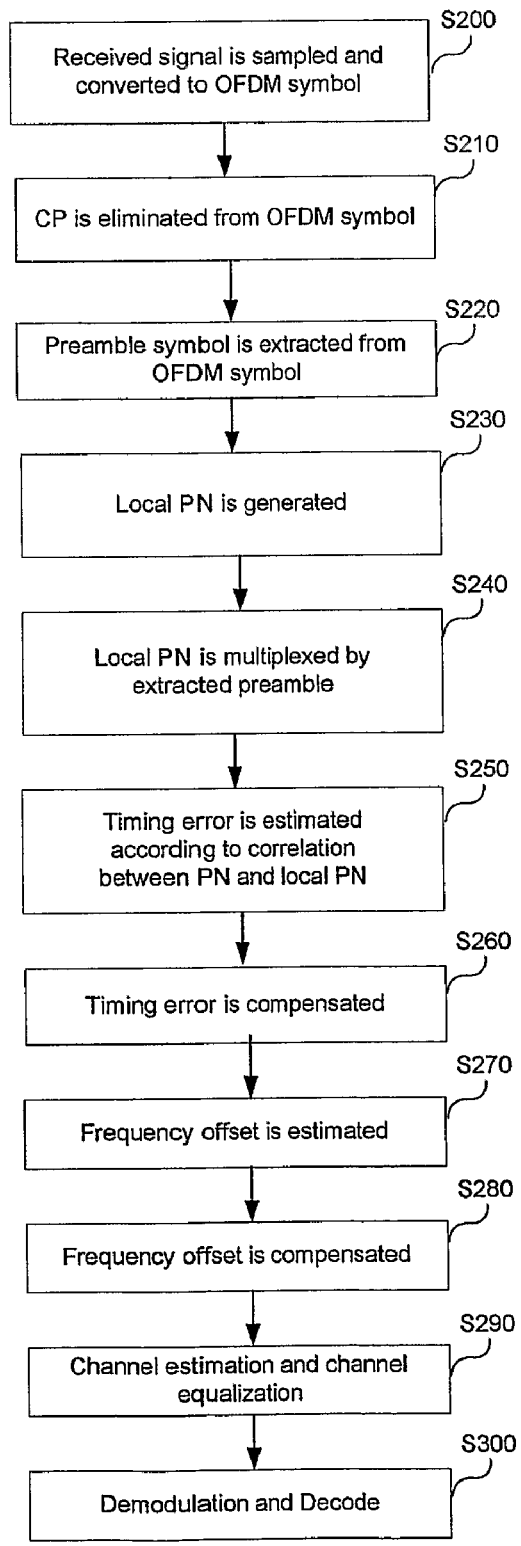

[FIG. 6]
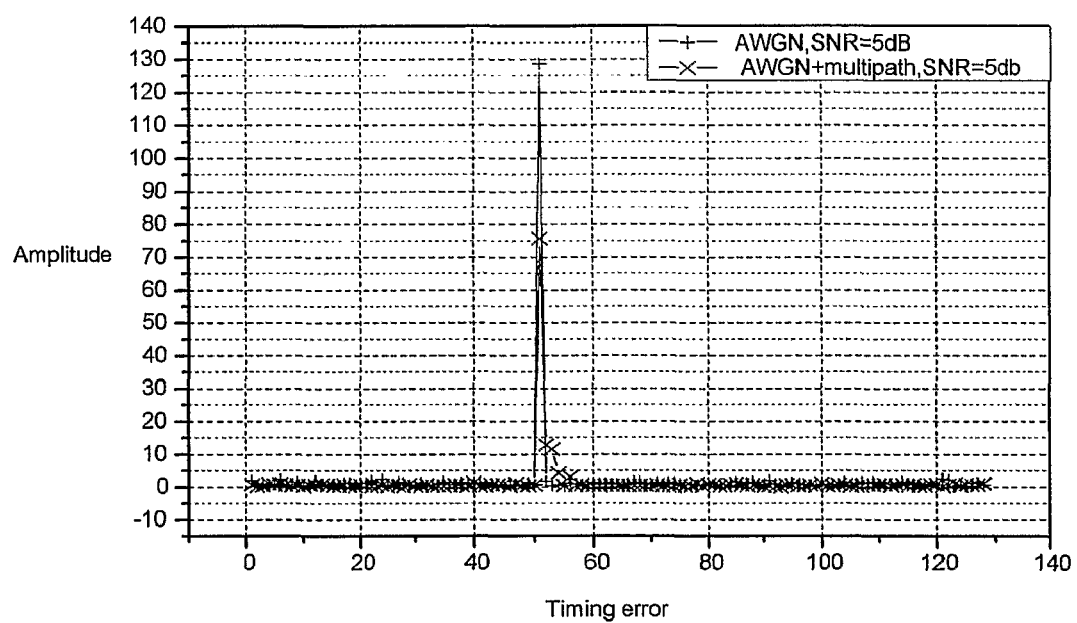

[FIG. 7]

Likelihood $\hat{\theta}$

| SNR(dB) | Likelihood $\hat{\theta}$ at AWGN | Likelihood $\hat{\theta}$ at multi-path channel |
|---|---|---|
| -2 | 99.95% | 99.91% |
| 0 | 99.99% | 99.98% |
| 2 | 100% | 100% |
| 4 | 100% | 100% |
| 6 | 100% | 100% |
| 8 | 100% | 100% |
| 10 | 100% | 100% |

[FIG. 8]
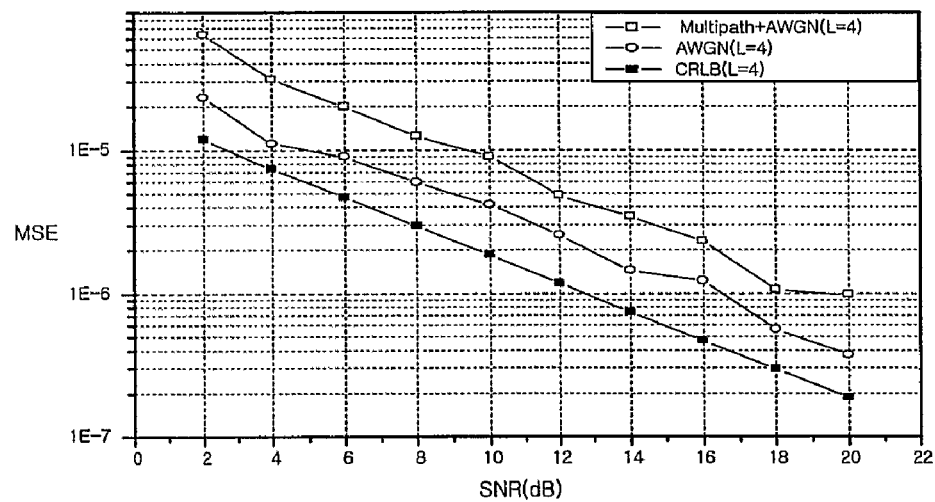

METHOD AND APPARATUS FOR ESTIMATING TIMING ERROR AND FREQUENCY OFFSET OF HPI SYSTEM

TECHNICAL FIELD

The present invention relates to an orthogonal frequency division multiplexing system, more particularly, to a method for estimating a timing error and a frequency offset in a high-speed portable Internet (hereinafter, referred to as HPi) system.

BACKGROUND ART

Wireless Internet services have been considered as an opportunity for a new market creation. At present, wireless Internet services have provided downloadable animated color graphics, called characters, and ring tones for mobile communication services.

However, these services do not completely satisfy various customer needs. That is, while requirements for low cost services and high-speed Internet service have increased, communication performance in a global system for mobile communication (GSM) and a code division multiple access (CDMA) do not fully satisfy customer needs. Therefore, it is required to develop a new portable Internet service. Specifically, it is required to provide a time division duplexing system in order to provide a low cost and high quality mobile multimedia service, and an orthogonal frequency division multiplexing (OFDM) method for efficiently reducing an inter-symbol interference (ISI), the OFDM method being supported by a simplified receiver and a cyclic prefix (CP) and used as a modulation method.

In the OFDM method, an input symbol sequence is parallelized and modulated into a plurality of subcarriers having orthogonality to each other. Compared to a conventional single carrier transmission method, the ISI may be efficiently reduced since a symbol transmission is maintained and a symbol duration is increased by the number of subchannels.

However, a frequency offset may occur since a transmitted frequency is not synchronized with a received frequency when a receiver tuning is inappropriate due to channel characteristics. The frequency offset changes a phase of the received signal and reduces decoding performance in a system. Especially in the OFDM method, since a symbol detection is performed for each subchannel, the orthogonality is not maintained between the respective subcarrier frequencies, and interference occurs between neighboring subchannels when the frequency offset occurs. In addition, since the respective subcarriers are densely distributed in a predetermined bandwidth as the number of OFDM subchannels is increased, the interference is significantly generated even when less frequency offset occurs.

Accordingly, methods for estimating and eliminating the offset generated in the receiver have been suggested. In the prior art, data-aided (DA) algorithms usually having synchronization information and non-data-aided (NDA) feedforward estimation structures having statistics on the received signals have been used.

In addition, because of the multipath channel, the signals received in the receiver of a portable Internet system are affected by the ISI before a fast Fourier transform (FFT) operation on the signals is performed. However, since the ISI is not considered in the prior art, the timing error and the frequency offset have not been correctly estimated.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method for correctly estimating a timing error and a frequency offset in a high-speed portable Internet system, and to provide a method for estimating the timing error and the frequency offset and for efficiently performing time-frequency synchronization.

Technical Solution

In an exemplary method for estimating a timing error and a frequency offset based on a received signal in a high speed portable Internet system according to an embodiment of the present invention, a) the received signal is processed to generate an orthogonal frequency division multiplexing (OFDM) symbol (a pseudo noise (PN) is multiplied by a predetermined symbol of the OFDM symbol), and a preamble symbol is extracted from the OFDM symbol, b) the extracted preamble symbol is multiplied by a local PN sequence (the local PN sequence is equal to a PN sequence of a transmitter that is shifted), c) the timing error is estimated based on an amplitude of a signal having the local PN sequence multiplied by the extracted preamble symbol, and the estimated timing error is compensated, and d) the frequency offset is estimated based on the preamble symbol multiplied by the local PN sequence, and the estimated frequency offset is compensated.

An exemplary estimator for estimating a timing error and a frequency offset based on a received signal in a high-speed portable Internet system according to an embodiment of the present invention includes a preamble extractor, a PN generator, a multiplexer, a timing error determining unit, and a frequency offset estimator. The preamble extractor extracts a preamble symbol from an OFDM symbol according to the received signal (a PN sequence is multiplexed by a predetermined symbol of the OFDM symbol). The PN generator generates a local PN sequence which is equal to the PN sequence but is shifted by a predetermined value. The multiplexer multiplexes the local PN sequence by the extracted preamble symbol. The timing error determining unit estimates the timing error based on the multiplexed signal and the frequency offset estimator estimates the frequency offset based on the preamble symbol multiplexed by the local PN sequence.

Advantageous Effects

According to the exemplary embodiment of the present invention, the timing error and the frequency offset may be correctly estimated when the signal transmitted by the transmitter is received and processed in a high speed portable Internet system. Accordingly, the parameters are correctly selected according to the estimate to effectively reduce the ISI and ICI by the multipath channel. Accordingly, the time-frequency synchronization is effectively performed.

In addition, compared to the transmitter and receiver of the conventional OFDM system, the estimator according to the exemplary embodiment of the present invention may be easily realized by adding the multiplexing operation in the transmitter and adding the multiplexing and adding operation in the receiver.

In addition, the timing error and the frequency offset may be estimated by using one PN sequence, and the efficiency of the estimator may be increased.

DESCRIPTION OF DRAWINGS

FIG. 1 shows a diagram representing an OFDM frame having a pilot symbol.

FIG. 2 shows a schematic diagram of a configuration or a transmitter in a system according to an exemplary embodiment of the present invention.

FIG. 3 shows a schematic diagram of a configuration of a receiver according to the exemplary embodiment of the present invention.

FIG. 4 shows a flowchart representing a transmitting process according to the exemplary embodiment of the present invention.

FIG. 5 shows a flowchart representing a receiving process while estimating a timing error and a frequency offset according to the exemplary embodiment of the present invention.

FIG. 6 shows a diagram representing the estimated timing error of a PN sequence according to the exemplary embodiment of the present invention.

FIG. 7 shows a table representing a likelihood $\hat{\theta}$ of falsely estimating the timing error in the exemplary embodiment of the present invention.

FIG. 8 shows a diagram representing minimum square errors (MSE) of the frequency offset estimator in respective channels according to the exemplary embodiment of the present invention.

BEST MODE

An exemplary embodiment of the present invention will hereinafter be described in detail with reference to the accompanying drawings.

With reference to the accompanying drawings, the present invention will be described in order for those skilled in the art to be able to implement the invention. As those skilled in the art would realize, the described embodiment may be modified in various different ways, all without departing from the spirit or scope of the present invention.

A method for estimating a timing error and a frequency offset according to an exemplary embodiment of the present invention will be described.

An orthogonal frequency division multiplexing (OFDM) signal $X_{i,n}$ is generated by an inverse fast Fourier transform (IFFT) in a baseband, so that the OFDM signal may be used for modulating N subcarriers. A cyclic prefix (CP) is added to the OFDM signal before transmitting the signal so as to maintain orthogonality and equalize channels in a system.

An output of the IFFT can be shown as Math Figure 1.

$$s_i(n) = \sum_{k=0}^{N-1} X_{i,k} e^{j\frac{2\pi}{N}k(n-(i-1)N_s)} Rect(n-(i-1)N_s)$$ [Math Figure 1]

$$N_s = N + N_g$$ [Math Figure 2]

Here, N and $N_g$ respectively denote the number of subcarriers and the length of a guard interval, $S_i(n)$ denotes an $n^{th}$ subcarrier transmitted in an $i^{th}$ block, and $X_{i,k}$ denotes a data symbol. Rect(n) denotes a rectangular pulse filter, and can be shown as Math Figure 3.

$$Rect(n) = \begin{cases} 1 & 0 \leq n < N_s \\ 0 & \text{otherwise} \end{cases}$$ [Math Figure 3]

There are a timing error $\theta$ and a standard frequency offset $\epsilon$ in a signal transmitted through a multipath fading channel.

$$h(n) = \sum_{l=0}^{L-1} \alpha_l \delta(n - \tau_l)$$ [Math Figure 4]

Here, $\alpha_l$ denotes a complex path gain of an $i^{th}$ path, and $\tau_l$ denotes a delay of the $i^{th}$ path. $\tau_0=0$, $\tau_1 > \tau_0$, $l \geq 1$, and L denotes the number of all the channel paths. It will be assumed that $\{\alpha_l\}$ is a wide-sense stationary (WSS) narrowband complex Gaussian process having a Jakes power spectrum, and for simplicity, a time dependence of a channel impulse response is suppressed in the notation, and total energy of each path is standardized. It will also be assumed that a channel is not varied in one OFDM signal, and a received $i^{th}$ OFDM signal can be shown as Math Figure 5.

$$r_i(n) = \alpha_i s_i(n-\theta) e^{j2\pi \epsilon n/N_s} + n(n)$$ [Equation 5]

$\theta$ denotes a timing error, and a frequency offset $\epsilon$ may be divided as an integer part and a fractional part. The integer part shifts frequency locations in a frequency domain by an integer offset, and the fractional part reduces the orthogonality between subcarriers in the OFDM system.

A defined pilot tone is multiplexed by data in a pilot ratio of 1/K. A frequency-domain tone can be shown as Math Figure 6.

$$P_l[k] = \begin{cases} A, & k = Km \\ 0, & k = km + i \end{cases}$$ [Math Figure 6]

Here, $1 \leq i \leq K-1$, $0 \leq m \leq M-1$, and M=N/K. A denotes a pilot amplitude, and K, m, i, and M are integers.

A corresponding time-domain pilot symbol can be shown as follows. A predetermined preamble symbol may be selected by Math Figure 6.

$$p_l(n) = IFFT\{P[k]\} = \frac{1}{N}\sum_{k=0}^{N-1} P[k] e^{j2\pi kn/N}$$ [Math Figure 7]

$$= \frac{A}{K}\sum_{r=0}^{K-1} \delta[n - Mr]$$

Since a window of a fast Fourier transform (FFT) demodulation is affected by a timing error, it is required to compensate a timing synchronization in a time domain. A signal before the FFT operation is lost is by an inter-symbol interference (ISI) due to a multipath channel, and performance of an estimator is affected by the ISI. However, the above mentioned problems have not been considered in transactions relating to a synchronization algorithm. Accordingly, in the exemplary embodiment of the present invention, a method for estimating the timing error and the frequency offset by considering the ISI based on a pseudo noise (PN) is provided.

Assuming that a first symbol L is used as a synchronization preamble symbol, a complex PN sequence can be shown as $C=[C_0, C_1, \ldots, C_i, \ldots, C_{LK-1}]$. $C_i=[c_i 0, \ldots, 0]^T$ is an MX×1 matrix, and T denotes a conjugate of a matrix. Assuming that a power of the PN is 1, $c_i \in \{\pm 1/\sqrt{2} + j(\pm 1/\sqrt{2})\}$, and the multiplexing operation on the preamble symbol and the PN sequence will be shown as $P=[P_0, P_1, \ldots, P_i, \ldots, P_{LK-1}]$. Here, $P_i=[c_i p_i, 0, \ldots, 0]^T$, and $p_i=A/K$. A matrix of a preamble symbol received after a signal is transmitted through a radio channel and an additive white Gaussian noise (AWGN) can be shown as Math Figure 8.

$$r^P = \Phi P(\theta) + n^P \quad \text{[Math Figure 8]}$$

Here, $P(\theta) = [0, \ldots, 0, P_0, P_1, \ldots, P_i, \ldots, P_{LK-1}]$, wherein a former part of $P(\theta)$ has a predetermined number of $\theta$ of 0, and $r^P = [r_0^P, r_1^P, \ldots, r_{N_s-1}^P, r_{N_s}^P, \ldots, r_{LN_s-1+\theta}^P]^T$.

$\Phi = \text{diag}(1, e^{j2\pi\epsilon/N_s}, \ldots, e^{j2\pi\epsilon(LN_s-1+\theta)/N_s})_{(LNs+\theta) \times (LN_s+\theta)}$, $n^P$ is a 0-average obtained by adding variance $\sigma_n^2 = N_0/2$ to a white Gaussian noise.

A local PN sequence (a copy of the PN sequence of a transmitter) is shifted, and added to a corresponding pilot signal in order to estimate the timing error, which will be shown as Math Figure 9.

$$\lambda(i) = C^H(i) r^P \quad \text{[Math Figure 9]}$$
$$= C^H(i) \Phi P(\theta) + n'$$
$$= \frac{A}{K} \sum_{n=i}^{LK-1} c^*_{(n-i)} c_{(n-\theta)} e^{j2\pi M\epsilon n/N_s} + n' \quad i = 0, \pm 1, \pm 2, \ldots$$

Here, * denotes a complex conjugate. Correlation is an important characteristic of the PN sequence, and the PN sequence has a large autocorrelation property.

$$R_c(i) = \sum_{k=1}^{LK} c(k) c^*(k+i) = \begin{cases} LK & i = 0 \\ -1 & i \neq 0 \end{cases} \quad \text{[Math Figure 10]}$$

Accordingly, the timing error and the frequency offset may be estimated as shown in Math Figure 11. The estimated timing error $\hat{\theta}$ is a maximum value of the amplitude $\lambda(i)$, which will be shown as Math Figure 11.

$$\hat{\theta} = \max_i |\lambda(i)| \quad \text{[Math Figure 11]}$$

After estimating the timing error, the frequency offset may be estimated as shown in Math Figure 12.

$$\eta(i) = c^*(i) r_i^P + n(i), i = 0, M, \ldots, (LK-1) \quad \text{[Math Figure 12]}$$

When a signal to noise ratio (SNR) is large, the frequency offset can be shown as Math Figure 13.

$$\hat{\epsilon} = \frac{1}{LK-m} \sum_{i=0}^{LK-m-1} \frac{N_s}{2\pi mM} arctg(\eta_i \eta^*_{i+m}) \quad \text{[Math Figure 13]}$$

m may be selected according to various channel conditions. According to the prior art, when m=2LK/3, maximized performance of a frequency offset estimator may be obtained. However, m is required to be small in the radio channel. Here, m=1, and an estimated range can be shown as Math Figure 14.

$$|\hat{\epsilon}| \leq \frac{N_s}{2mM} \quad \text{[Math Figurre 14]}$$

With reference to Math Figure 9, when LK is great, $\lambda(i)$ may be considered as a complex Gaussian random variable. In general, the timing error is small (LK>>$\theta$). When the estimated timing error is true (i=$\theta$) an average of $\lambda(i)$ can be shown as Math Figure 15.

$$\xi = E[\lambda(i)] \quad \text{[Math Figure 15]}$$
$$\approx \frac{A}{K} \sum_{n=0}^{LK-1} c^*_n c_n e^{j2\pi n M\epsilon/N_s}$$
$$= \frac{A}{K} \sum_{n=0}^{LK-1} e^{j2\pi n M\epsilon/N_s}$$
$$= \begin{cases} AL \cdot \frac{\sin(\pi LKM\epsilon/N_s)}{\sin(\pi M\epsilon/N_s)}, & \epsilon \neq 0 \\ AL, & \epsilon = 0 \end{cases}$$

Accordingly, variance may be also obtained in a like manner.

$$\sigma^2 = \frac{1}{LK} \sum_{i=0}^{LK-1} E[|c_i^* r_i^P - E(c_i^* r_i^P)|^2] \quad \text{[Math Figure 16]}$$
$$= \frac{1}{LK} \sum_{i=0}^{LK-1} E\left[\left|c_i^* r_i^P - \frac{A}{K} e^{j\pi\epsilon i/N_s}\right|^2\right]$$
$$\approx \sigma_n^2$$

$\sigma_n^2$ denotes variance of the additive Gaussian white noise. When the timing error is correctly estimated by an estimator, an average of $\xi$ is 0. When the estimator estimates the timing error by using Math Figure 16, the average of $\lambda(i)$ is greater than 0. Accordingly, the possibility of a false decision is lower, and a possibility of a correct decision can be shown as Math Figure 17.

$$F_{|\lambda(\theta)|}(x) \approx 1 - Q\left(\frac{x-\xi}{\sigma}\right) \quad \text{[Math Figure 17]}$$
$$\text{Here, } Q(x) = \frac{1}{\sqrt{2\pi}} \int_x^\infty e^{-t^2/2} dt.$$

FIG. 1 shows a diagram representing an OFDM signal having a pilot symbol. A pilot pattern is a sequence pattern in the frequency domain. According to a sampling operation after the frequency domain, an appropriate pilot interval $N_K$ in the time domain will be shown as Math Figure 18.

$$F_{d\,max} \cdot T_s \cdot N_k \leq \frac{1}{2} \quad \text{[Math Figure 18]}$$

Here, $F_{d\,max}$ denotes a maximum value of a Doppler frequency. $T_s$ denotes a duration of a transmitted symbol including the CP.

In the exemplary embodiment of the present invention, the first preamble symbol L is used for estimating the timing error and the frequency offset in the HPi system. A design of the preamble symbol can be shown as Math Figure 6. Hereinafter, a symbol to be described indicates a data symbol for transmitting user information. In addition, a pilot subcarrier is added to the data symbol to trace a phase shift.

A transmitter and a receiver for transmitting and receiving a signal will now be described based on the method for estimating the timing error and the frequency offset according to the exemplary embodiment of the present invention.

FIG. 2 shows a schematic diagram of a configuration of a transmitter in a system according to the exemplary embodiment of the present invention.

As shown in FIG. 2, the transmitter 200 according to the exemplary embodiment of the present invention includes an encoder 201 for encoding bits of data to be transmitted, a modulator 202 for outputting the encoded bits as a predetermined symbol, a serial/parallel converter (S/P) 203 for converting the modulated symbol into a parallel symbol, an IFFT 204 for performing the IFFT and outputting an OFDM symbol, a PN generator 205 for generating the PN, a plurality of multiplexers 206, 207, and 208 for multiplexing a preamble symbol and a PN sequence of the OFDM symbol, an adder 209 for adding a CP to the OFDM symbol, a parallel/serial converter (P/S) 210 for converting the CP added OFDM symbol into a serial symbol, and a digital/analogue (D/A) converter 211 for converting the serial converted OFDM symbol into an analogue signal and transmitting the analogue signal to the radio link.

FIG. 3 shows a schematic diagram of a configuration of the receiver according to the exemplary embodiment of the present invention.

As shown in FIG. 3, the receiver 300 according to the exemplary embodiment of the present invention includes an analogue/digital (A/D) converter 301 for converting the received signal into the OFDM symbol which is a digital bit stream, a CP eliminator 302 for eliminating the CP from the OFDM symbol, a preamble extractor 303 for extracting the preamble symbol from the OFDM symbol to estimate the timing error and the frequency offset, a local PN generator 304 for generating the local PN sequence to estimate the timing error, multiplexers 305, 306, and 307 for respectively multiplexing the generated local PN sequence by the extracted preamble symbol, a timing error determining unit 308 for calculating the timing error based on the multiplexed signal, a timing error compensator 309 for compensating the generated timing error, a frequency offset estimator 310 for estimating the frequency error by using the preamble symbol extracted according to a predetermined condition, a frequency compensator 311 for compensating the estimated frequency offset, an FFT 312 for performing the FFT operation on the OFDM symbol having the compensated timing error and frequency offset and outputting it as a frequency domain signal, a channel estimator 313 for estimating a channel based on the frequency domain signal, a channel equalizer 314 for performing a channel equalization based on the channel estimate, a demodulator 315 for demodulating the channel equalized signal, and a decoder 316 for decoding the demodulated signal. A device for estimating the timing error and the frequency offset according to the exemplary embodiment of the present invention may be realized by wholly or selectively combining constituent elements of the receiver 300.

An operation of the transmitter according to the exemplary embodiment of the present invention will be described based on the configuration described above.

FIG. 4 shows a flowchart representing a transmitting process according to the exemplary embodiment of the present invention.

As shown in FIG. 4, data to be transmitted are encoded by the encoder 201, and are modulated to be a predetermined symbol by the modulator 202 in step S100. The encoder 201 encodes the data by using a convolution coder, a turbo coder, and a low density parity check (LDPC) coder. In addition, the modulation is performed by 64 quadrature amplitude modulation (QAM), 16 QAM, and quadrature phase shift keying (QPSK) methods.

While the modulated data symbol is converted into a parallel symbol by the serial/parallel converter 203 in step S110, a payload sequence as shown in Math Figure 6 is annexed to the preamble symbol L of the parallel symbol. A remaining value between two non-zero values of a preamble sequence corresponding to the preamble symbol is 0.

The parallel symbol is input to the IFFT 204 and is output as the OFDM symbol in step S120. The preamble symbol L is converted as shown in Math Figure 7 after the IFFT operation. An interval between the two non-zero values of the preamble sequence after the IFFT operation varies according to a length of a subcarrier in one OFDM symbol and the interval between the two non-zero values of the preamble sequence before the IFFT operation.

The PN generator 205 generates the PN sequence, and the multiplexers 206, 207, and 208 multiplex the preamble symbol of the OFDM symbol output from the IFFT 204 by the PN sequence in step S130. The preamble symbol including the timing error and the frequency offset are shown as Math Figure 8.

To eliminate the ISI, the CP generated by the CP adder 209 is added to the OFDM symbol in step S140, and the OFDM symbol having the added CP is converted into the serial symbol by the parallel/serial converter 210 in step S150. In addition, the signal converted into the serial symbol is converted into the analogue signal by the D/A converter 211, and the converted analogue signal is transmitted to the radio channel in step S160.

An operation of the receiver for receiving the transmitted signal will be described based on the method for estimating the timing error and the frequency offset according to the exemplary embodiment of the present invention.

FIG. 5 shows a flowchart representing a receiving process according to the exemplary embodiment of the present invention.

The receiver 300 receives the signal processed as above. The received signal is sampled, and is converted into an OFDM symbol, which is a digital bit stream, by the A/D converter 301 in step S200.

As shown in FIG. 5, the CP eliminator 302 of the receiver 300 eliminates the CP from the OFDM symbol, and the preamble extractor 303 extracts the preamble symbol from the OFDM symbol in order to estimate the timing error and the frequency offset in steps S210 to S220.

In addition, the PN generator 304 generates the local PN sequence to estimate the timing error. While the local PN sequence is a copy of the PN sequence generated by the transmitter 200, it is shifted by a predetermined value in step S230. As shown in Math Figure 9, the multiplexers 205, 206, and 207 multiplex the shifted PN signal (i.e., the PN sequence) by the extracted preamble signal in step S240.

The timing error determining unit 308 estimates the timing error according to the OFDM signal multiplexed by the local PN sequence. That is, the timing error is estimated according to the correlation between the PN sequence and the local PN sequence, and the maximum value of the amplitude $\lambda(i)$ calculated according to Math Figure 9 is estimated as the timing error. The estimated timing error is compensated by the timing error compensator 309 in steps S250 to S260.

After compensating the timing error, the frequency offset estimator 310 estimates the frequency offset as shown in Math Figure 13, and the frequency compensator 311 compensates the estimated frequency offset in steps S270 to S280. After compensating the timing error and the frequency offset, the FFT 312 converts the received signal into a frequency domain signal.

Because of the multipath channel, the channel estimator 313 may be considered as having a channel transmission function in the frequency domain. The channel estimator 313 performs a plurality of algorithms (e.g., averaging/smoothing algorithms) for the channel estimate including a maximum likelihood estimate in the frequency domain, and generates the channel parameter according to the channel estimate.

The channel equalizer 314 generates a channel equalization frequency domain symbol in step S290 by using the channel parameter provided from the channel estimator 313. The demodulator 315 demodulates the channel equalization frequency domain symbol, and demodulates the subcarrier according to predetermined modulation methods used by the transmitter to modulate the subcarrier (e.g., the 64 QAM, 16 QAM, and QPSK methods are used). That is, the subcarrier is demodulated according to a predetermined modulation order (e.g., 64 QAM, 16 QAM, QPSK) used by the transmitter 200 to modulate the subcarrier. The parallel symbol output from the demodulator 315 is converted into a serial stream, and the serial symbol is decoded by the decoder 316 in step S300.

The following test is to evaluate the performance of the estimator for estimating the timing error and the frequency offset in the HPi system according to the exemplary embodiment of the present invention.

The number N of subcarriers is 2048, and a Monte Carlo algorithm is used to evaluate the performance of the estimator for estimating the frequency offset.

The pilot symbol interval $N_k$ is 16, and the CP length $N_G$ is N/16.

In this case, the complex PN sequence satisfies $$P_I(x) = x^{15} + x^{13} + x^9 + x^8 + x^7 + x^5 + 1,$$

and $$P_Q(x) x^{15} + x^{12} + x^{11} + x^{10} + x^6 + x^5 + x^4 + x^3 + 1.$$

FIG. 6 shows a diagram representing the estimated timing error of the PN sequence according to the exemplary embodiment or the present invention. An SNR is 5 dB, and two channel types exist. One of the two channel types is an AWGN channel, and the other is a combination of a multipath channel and an AWGN channel. As shown in FIG. 6, peak values of the PN sequence are respectively 128 and 80, which are values corresponding to the corrected timing errors. The peak value is greater than that of a lowest class channel. Accordingly, it is not likely to estimate the timing error.

FIG. 7 shows a table representing a likelihood $\hat{\theta}$ of falsely estimating the timing error in the exemplary embodiment of the present invention. The estimator may correctly estimate parameters even when the SNR is applied, since the PN has widespread gain P (i.e., P=2048/16) as shown in FIG. 6.

FIG. 8 shows a diagram representing minimum square errors (MSE) of the frequency offset estimator in respective channels according to the exemplary embodiment of the present invention. The number of preamble symbols for synchronization is 4. A general model having six paths is used as a channel model. The MSE is close to a Cramer-Rao lower bound (CRLB) in the multipath channel. Since ISI elimination is considered in the method according to the exemplary embodiment of the present invention, the performance in the multipath channel is close to the CRLB. The performance in the multipath channel gets worse than that in the AWGN since the amplitude is reduced and the SNR is affected.

According to the exemplary embodiment of the present invention, when the parameter is correctly selected, the ISI and inter-carrier interference (ICI) by the multipath channel may be effectively reduced. That is, the preamble symbol received as shown in Math Figure 8 will be as shown in Math Figure 19.

$$r_i^p = \sum_{l=0}^{U-1} \alpha_l c_{i-l} p_{i-l}(\theta) e^{j2\pi\varepsilon(i-l)/N_s} + n(i)$$ [Math Figure 19]

$$i = 0, 1, \ldots, (L-1)N_s - 1$$

Accordingly, the data in $r_i^p$ is affected by other data, which is referred to as the ISI and the ICI. (M−1) data is 0 in a former part of the non-zero data in the algorithm according to the exemplary embodiment of the present invention. When assuming that U≦M−1, U is determined by a maximum delay $\tau_{max}$ and a symbol rate Rsps (U≈⌈τR⌉) of the multipath channel. Accordingly, the ISI is eliminated, and the performance of the timing error and frequency offset estimator for synchronization may be increased.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

According to the exemplary embodiment of the present invention, the timing error and the frequency offset may be correctly estimated when the signal transmitted by the transmitter is received and processed in a high speed portable Internet system. Accordingly, the parameters are correctly selected according to the estimate to effectively reduce the ISI and ICI by the multipath channel. Accordingly, the time-frequency synchronization is effectively performed.

In addition, compared to the transmitter and receiver of the conventional OFDM system, the estimator according to the exemplary embodiment of the present invention may be easily realized by adding the multiplexing operation in the transmitter and adding the multiplexing and adding operation in the receiver.

In addition, the timing error and the frequency offset may be estimated by using one PN sequence, and the efficiency of the estimator may be increased.

The invention claimed is:

1. A method for estimating a timing error and a frequency offset based on a received signal in a high speed portable Internet system, the method comprising:
 a) processing the received signal to generate an Orthogonal Frequency Division Multiplexing (OFDM) symbol, wherein the OFDM symbol comprises a predetermined preamble symbol multiplexed with a Pseudo Noise (PN) sequence of a transmitter and wherein a remaining value between two non-zero values of a preamble sequence corresponding to the preamble symbol is 0, and extracting a preamble symbol from the OFDM symbol;
 b) multiplexing the extracted preamble symbol by a local PN sequence, wherein the local PN sequence is equal to the PN sequence of the transmitter but is shifted;
 c) estimating the timing error based on an amplitude of a signal having the local PN sequence multiplexed by the extracted preamble symbol, and compensating for the estimated timing error; and d) estimating the frequency offset based on the preamble symbol multiplexed by the local PN sequence, and compensating for the estimated frequency offset, wherein the amplitude of the signal is determined based on the local PN sequence and the PN sequence.

2. The method of claim 1, wherein, in c), a maximum value of the amplitude of the signal having the local PN sequence multiplexed by the extracted preamble symbol is estimated as the timing error.

3. The method of claim 2, wherein the amplitude satisfies:

$$\lambda(i) = C^H(i)r^P$$
$$= C^H(i)\Phi P(\theta) + n'$$
$$= \frac{A}{K}\sum_{n=i}^{LK-1} c^*_{(n-i)} c_{n-\theta} e^{j2\pi M \varepsilon n/N_s} + n' \quad i = 0, \pm 1, \pm 2, \ldots$$

wherein, $\lambda(i)$ denotes the amplitude, K and A are integers, $C(n-i)$ denotes the PN sequence, $C_{(n-0)}$ denotes the local PN sequence, $\theta$ denotes the timing error, * denotes a complex conjugate, $r^P=[r_0^P, r_1^P, \ldots, r_{N_s-1}^P, r_{N_s}^P, \ldots, r_{LN_s-1+\theta}^P]^T$, $\Phi=\text{diag}(1, e^{j2\pi\varepsilon/N_s}, \ldots, e^{j2\pi\varepsilon(LN_s-1+\theta)/N_s})_{(LN_s+\theta)\times(LN_s+\theta)}$, and $n^P$ denotes a 0-average obtained by adding variance $$\sigma_n^2 = N_0/2$$

to a white Gaussian noise.

4. The method of claim 1, further comprising:

adding the predetermined preamble symbol to a signal to be transmitted from the transmitter;

performing an Inverse Fast Fourier Transform (IFFT) operation on the signal having the predetermined symbol, and varying an interval between the two non-zero values of the preamble sequence after the IFFT operation, according to a length of a subcarrier in one OFDM symbol and the interval between the two non-zero values of the preamble sequence before the IFFT operation; and multiplexing the predetermined preamble symbol of the IFFT signal by the PN sequence.

5. The method of any one of claim 1 to claim 4, wherein the predetermined preamble symbol is selected based on:

$$P_l[k] = \begin{cases} A, & k = Km \\ 0, & k = km + i \end{cases}$$

wherein, K, m, i, and M are integers, $1 \leq i \leq K-1$, $0 \leq m \leq M-1$, A denotes a pilot amplitude, and M=N/K.

6. The method of any one of claim 1 to claim 4, wherein the frequency offset estimated in d) satisfies:

$$\hat{\varepsilon} = \frac{1}{LK-m}\sum_{i=0}^{LK-m-1}\frac{N_s}{2\pi mM}arctg(\eta_i\eta^*_{i+m})$$

wherein, m is selected according to respective channel conditions, and a range estimated when m=1 satisfies $$|\hat{\varepsilon}| \leq \frac{N_s}{2mM}.$$

7. The method of any one of claim 1 to claim 4, wherein the predetermined preamble symbol satisfies:

$$\eta(i)=c^*(i)r_i^P+n(i), i=0, M, \ldots, (LK-1)M.$$

8. The method of claim 4, further comprising:

eliminating an Inter-Carrier Interference (ICI) and an Inter-Symbol Interference (ISI) based on parameters including a maximum delay, a symbol rate of a multipath channel, and an interval between the two non-zero values of the preamble sequence.

9. An estimator for estimating a timing error and a frequency offset based on a received signal in a high-speed portable Internet system, the estimator comprising:

a preamble extractor for extracting a preamble symbol from an Orthogonal Frequency Division Multiplexing (OFDM) symbol according to the received signal, wherein the OFDM symbol comprises a predetermined preamble symbol multiplexed with a Pseudo Noise (PN) sequence and wherein a remaining value between two non-zero values of a preamble sequence corresponding to the preamble symbol is 0;

a Pseudo Noise (PN) generator for generating a local PN sequence which is equal to the PN sequence but is shifted;

a multiplexer for multiplexing the local PN sequence by the extracted preamble symbol;

a timing error determining unit for estimating the timing error based on a signal having the local PN sequence multiplexed by the extracted preamble symbol; and a frequency offset estimator for estimating the frequency offset based on the preamble symbol multiplexed by the local PN sequence, wherein the amplitude of the signal is determined based on the local PN sequence and the PN sequence.

10. The estimator of claim 9, wherein the timing error determining unit estimates a maximum value of an amplitude of the signal having the local PN sequence multiplexed by the extracted preamble as the timing error.

11. The estimator of claim 9, further comprising:

a timing error compensator for compensating for the timing error; and a frequency offset compensator for compensating for the frequency offset.

* * * * *